United States Patent [19]
Kirchgessner et al.

[11] 3,770,231
[45] Nov. 6, 1973

[54] ENGINE MOUNT WITH THRUST LIMITING AND DAMPING MEANS

[75] Inventors: Edwin M. Kirchgessner; Nelson A. Jones; Ronald R. Anderson, all of Peoria, Ill.

[73] Assignee: Caterpillar Tractor Co., Peoria, Ill.

[22] Filed: June 2, 1972

[21] Appl. No.: 259,166

[52] U.S. Cl. .................................. 248/9, 180/64 R
[51] Int. Cl. .................................. F16m 5/00
[58] Field of Search ..................... 248/358 R, 9, 10, 248/5, 15, 18, 22, 24; 287/85 R; 267/153; 180/64 R

[56] References Cited
UNITED STATES PATENTS

| 1,694,756 | 12/1928 | Short | 248/9 |
|---|---|---|---|
| 2,351,427 | 6/1944 | Henshaw | 248/358 R |
| 1,876,812 | 9/1932 | Wiley et al | 248/9 |
| 2,715,508 | 8/1955 | Small | 248/5 |
| 1,881,777 | 10/1932 | McPherson | 248/10 |

Primary Examiner—J. Franklin Foss
Attorney—Paul S. Lempio et al.

[57] ABSTRACT

A bushing assembly employed in an engine mount comprises a cup-shaped housing, an inner sleeve having a engine support trunnion mounted therein and an annular elastomeric bushing interposed between the housing and sleeve. An elastomeric pad is interposed between an end wall of the housing and an end of the trunnion to substantially absorb impact loads imposed thereon by the trunnion.

5 Claims, 3 Drawing Figures

PATENTED NOV 6 1973 3,770,231
FIG.1.
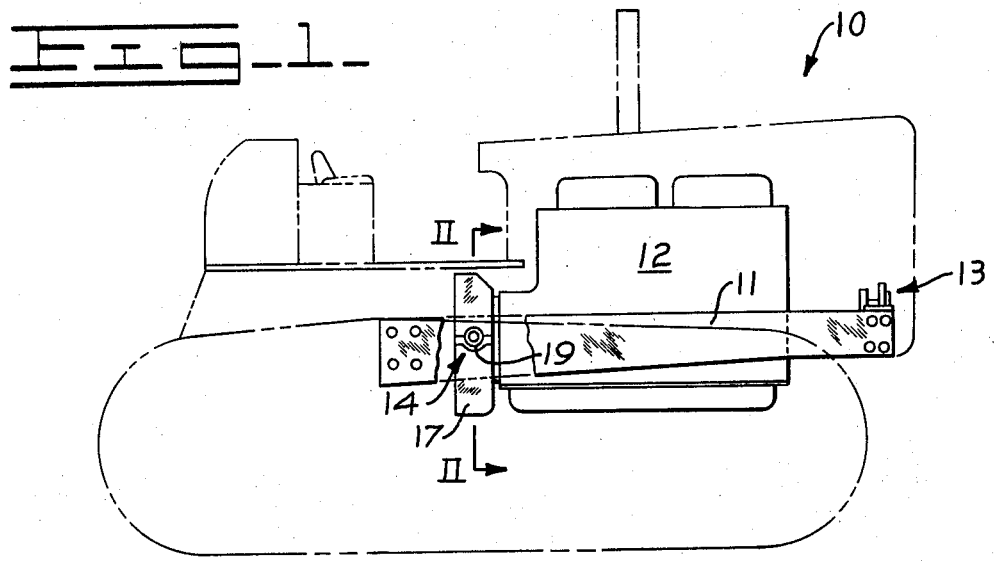
FIG.2.
FIG.3.
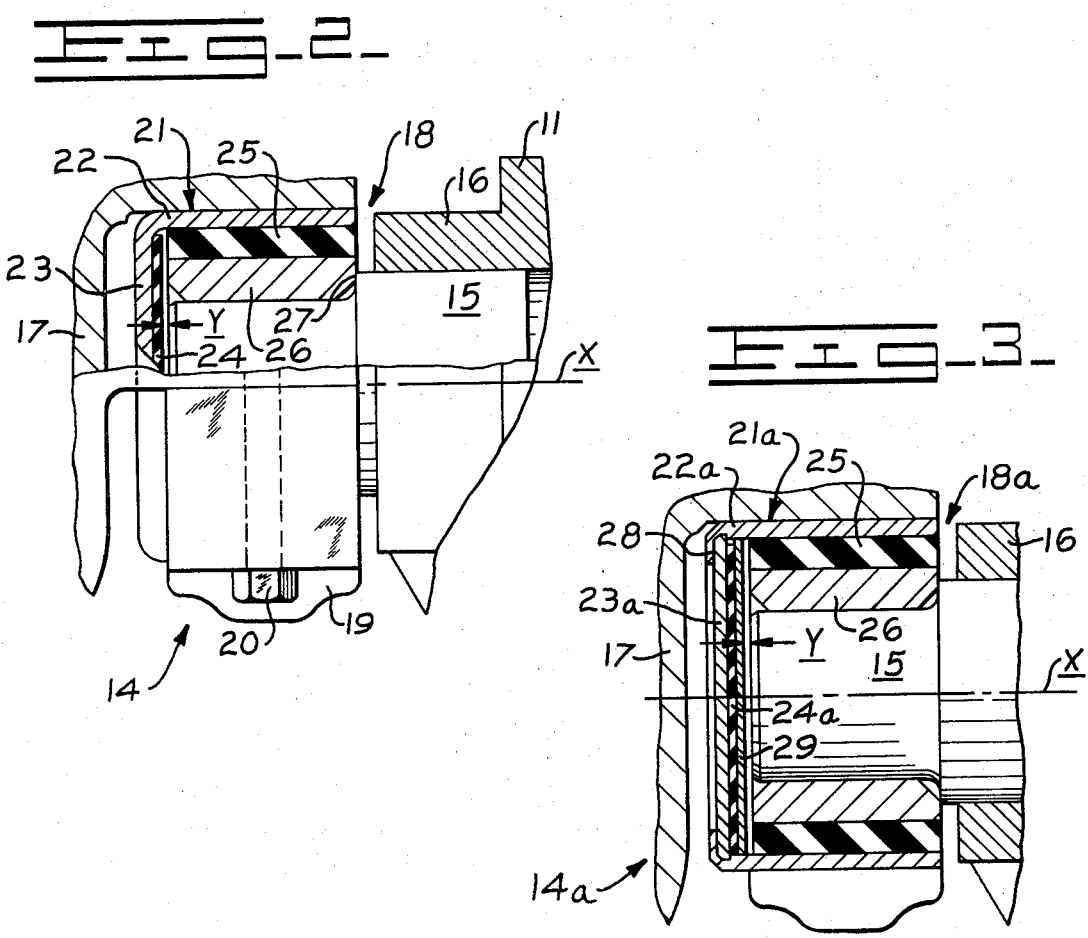

ENGINE MOUNT WITH THRUST LIMITING AND DAMPING MEANS

BACKGROUND OF THE INVENTION

A typical three-point engine support system comprises a pair of trunnions positioned on opposite sides of the engine for mounting the aft end thereof on a vehicle frame. Since the engine mount for each trunnion is subjected to dynamic forces during vehicle operation, a rubber support bushing is normally utilized therein to deter the transmission of such forces from the frame to the engine. Although the support bushing substantially absorbs forces acting radially relative to the trunnion, the bushing does not adequately isolate forces transmitted axially therealong.

Since the rubber bushing is structurally weaker and exhibits a lower spring rate in shear than in compression, the engine tends to become displaced transversely relative to the frame to induce engine drive train misalignment problems. As a result, the engine, flywheel housing and associated drive train components are severely stressed and are thus prone to failure. Such engine displacement further creates vibrational forces and associated noise, due to the metal-to-metal contact occurring between the support trunnion and the vehicle frame.

SUMMARY AND OBJECTS OF THE INVENTION

An object of this invention is to provide an improved bushing assembly, particularly adapted for use in an engine mount to limit transverse displacement of the engine relative to a vehicle frame and to substantially reduce the transmission of vibrational forces and associated noise between the engine and vehicle frame.

In the preferred embodiment of this invention, the bushing assembly comprises a cup-shaped housing, a cylindrical sleeve and an annular elastomeric bushing compressed between a cylindrical sidewall of the housing and the sleeve. A combined thrust limiting and damping means is adapted to be positioned between and end wall of the housing and the engine support trunnion to provide the above-mentioned operating desiderata.

BRIEF DESCRIPTION OF THE DRAWINGS

FIG. 1 is a side elevational view of a track-type tractor, shown in phantom lines, having an engine mount of this invention employed therein.

FIG. 2 is an enlarged, sectional view of the engine mount, taken in the direction of arrows II—II in FIG. 1.

FIG. 3 is a view similar to FIG. 2, but illustrating a modified engine mount.

DESCRIPTION OF THE PREFERRED EMBODIMENT

Referring to FIG. 1, a track-type tractor 10 comprises a frame 11 having an engine 12 supported thereon by three engine mounts disposed in triangular relationship with respect to each other. A first engine mount 13, similar to that disclosed in U.S. Pat. No. 3,633,856, assigned to the assignee of this application, is provided at the front, longitudinal center of the engine. Second and third identical engine mounts 14 (one shown) are provided at the rear of the engine and on opposite, transverse sides thereof.

As best shown in FIG. 2, each engine mount 14 comprises a cylindrical support member or trunnion 15, disposed on an axis X which is perpendicular to the longitudinal centerline of the vehicle. A first end of the trunnion is secured to frame 11 by a bracket 16 whereas a second end, having a reduced diameter, mounts a flywheel housing 17 of the engine thereon by a bushing assembly 18. The bushing assembly may be attached to the flywheel housing by a bushing cap 19 and two bolts 20.

Each bushing assembly comprises a cup-shaped housing 21 having a cylindrical sidewall 22 integrally formed with a transversely disposed and substantially flat end wall 23. A flat, circular elastomeric pad 24 is secured to the inner face of the end wall. The end wall and pad cooperate to provide a hereinafter more fully described combined thrust limiting and damping means at one end of the bushing assembly.

An annular elastomeric bushing 25 is bonded to a cylindrical sleeve 26 and is preferably compressed between the sleeve and concentric sidewall 22, in the manner described in U.S. Pat. No. 3,633,856. The assembled bushing assembly is preferably mounted on trunnion 15 so that a first end of sleeve 26 axially abuts a flange portion 27 of the trunnion. A small axial clearance Y is provided between the co-extensive free ends of the trunnion and the sleeve and pad 24 for purposes hereinafter explained.

FIG. 3 illustrates a modified bushing assembly 18a wherein corresponding constructions are referenced by like numerals, with certain numerals depicting modified constructions being accompanied by an "a." The bushing assembly comprises a cup-shaped housing 21a closed at one end by a circular end wall 23a, detachably secured to a cylindrical sidewall 22a by annular flange means 28. A protective disc 29 and the end wall have a circular elastomeric pad 24a disposed therebetween to provide a combined thrust limiting and dampening means thereat. In addition to providing certain manufacturing advantages, the FIG. 3 bushing assembly fully protects pad 24a against potential impact damage by interposing the protective disc between the end of trunnion 15 and the pad.

OPERATION

During engine operation, each engine mount 14 and 14a will exhibit a substantially high radial spring rate for absorbing vibrational forces acting radially relative to a longitudinal axis X. In particular, elastomeric member 25 compensates for limited radial displacement of inner sleeve 26 relative to a respective housing. However, such member will not adequately absorb shearing loads imposed thereon in the direction of axis X.

Such loads are most prevalent when tractor 10 is operated on a slope or oven uneven terrain which tends to displace engine 12 laterally with respect to frame 11. The bushing assembly of this invention, comprising the above-described thrust limiting and damping means, limits such lateral engine displacement to clearance Y which is substantially less than the shear limit of bushing 25. In addition, elastomeric pads 24 and 24a each function to cushion the impact of the end of trunnion 15 on end walls 23 and 23a The pads thus dampen vibrational forces and the accompanying noise normally transmitted between the engine and vehicle frame.

Bushings 25 and pads 24 and 24a are composed of a suitable elastomeric material, such as rubber or plastic, which will exhibit sufficient elasticity and related physical and chemical characteristics to continuously provide the above-discussed impact cushioning and dampening desiderata. The attendant supporting structures are preferably metallic to provide the support assemblies with high degrees of structural integrity.

While the invention has been described and shown with particular reference to the preferred embodiment, it will be apparent that variations might be possible that would fall within the scope of the present invention, which is not intended to be limited except as defined in the following claims.

What is claimed is:

1. In an engine mount comprising a bushing assembly mounted between an engine and a support trunnion secured to a vehicle frame, the invention wherein said bushing assembly comprises a cup-shaped housing having an end wall spaced axially inwardly from an adjacent wall of said engine, a cylindrical sleeve mounted on said trunnion, an annular elastomeric bushing compressed between a cylindrical sidewall of said housing and said sleeve and combined thrust limiting damping means, including elastomeric pad means abutting said end wall, positioned closely adjacent to an end of said support trunnion to define a small axial clearance therebetween which is less than the axial shear limit of said elastomeric bushing for limiting the axial displacement of said support and for substantially absorbing impact loads imposed thereon solely by axial engagement with the end of said support trunnion.

2. The invention of claim 1 wherein said end wall is integrally formed with the cylindrical wall of said housing.

3. The invention of claim 1 wherein said end wall is detachably secured to the cylindrical wall of said housing by annular flange means.

4. The invention of claim 1 wherein said combined thrust limiting and damping means further comprises a protective member mounted between said elastomeric pad and said support trunnion.

5. The invention of claim 4 wherein said protective member comprises a rigid disc interposed between said pad means and said trunnion in substantial parallel relationship with said end wall to protect said pad means against impact damage.

* * * * *